(12) United States Patent
Zhang et al.

(10) Patent No.: US 9,836,139 B2
(45) Date of Patent: Dec. 5, 2017

(54) METHOD AND TERMINAL DEVICE FOR OPERATION CONTROL OF OPERATION OBJECT

(75) Inventors: Yuanyi Zhang, Beijing (CN); Junfeng Liu, Beijing (CN); Qianying Wang, Beijing (CN); Zhiqiang He, Beijing (CN)

(73) Assignees: BEIJING LENOVO SOFTWARE LTD., Haidian District, Beijing (CN); LENOVO (BEIJING) CO., LTD., Haidian District, Beijing (CN)

(*) Notice: Subject to any disclaimer, the term of this patent is extended or adjusted under 35 U.S.C. 154(b) by 138 days.

(21) Appl. No.: 13/513,948

(22) PCT Filed: Dec. 7, 2010

(86) PCT No.: PCT/CN2010/079507
§ 371 (c)(1),
(2), (4) Date: Jun. 5, 2012

(87) PCT Pub. No.: WO2011/069435
PCT Pub. Date: Jun. 16, 2011

(65) Prior Publication Data
US 2012/0242611 A1    Sep. 27, 2012

(30) Foreign Application Priority Data

Dec. 7, 2009 (CN) .......................... 2009 1 0241771
Dec. 11, 2009 (CN) .......................... 2009 1 0242423

(51) Int. Cl.
*G06F 3/041* (2006.01)
*G06F 3/0354* (2013.01)
(Continued)

(52) U.S. Cl.
CPC ...... *G06F 3/03547* (2013.01); *G06F 3/04845* (2013.01); *G06F 3/04883* (2013.01);
(Continued)

(58) Field of Classification Search
CPC .... G06F 3/04883; G06F 3/017; G06F 3/0481; G06F 3/0482; G06F 1/1626;
(Continued)

(56) References Cited

U.S. PATENT DOCUMENTS 8,130,207 B2 *   3/2012   Nurmi et al. ................. 345/173
8,345,014 B2 *   1/2013   Lim ............................. 345/173
(Continued)

FOREIGN PATENT DOCUMENTS

CN   1926500      3/2007
CN   101441541    5/2009
(Continued)

OTHER PUBLICATIONS

PCT/CN2010/079507 International Preliminary Report on Patentability dated Jun. 12, 2012 (5 pages).
(Continued)

*Primary Examiner* — Jennifer Mehmood
*Assistant Examiner* — Sardis F Azongha
(74) *Attorney, Agent, or Firm* — Brinks Gilson & Lione; G. Peter Nichols

(57) ABSTRACT

A method and a terminal device for operation control of an operation object are provided. The method includes getting a first operation direction and a second operation direction of the operation object, determining an operation corresponding to the direction combination relation between the first operation direction and the second operation direction, and performing the operation on the operation object. The solution enables two kinds of operations on the operation object simultaneously and generates an operation effect that two kinds of operations are performed simultaneously.

22 Claims, 8 Drawing Sheets

(51) Int. Cl.
  *G06F 3/0484* (2013.01)
  *G06F 3/0488* (2013.01)

(52) U.S. Cl.
  CPC .............. *G06F 2203/04806* (2013.01); *G06F 2203/04808* (2013.01)

(58) Field of Classification Search
  CPC .............. G06F 3/04845; G06F 3/0421; G06F 3/03547; G06F 3/041; G06F 2203/04808; G06F 2203/048; G06T 15/00; G06T 15/10; G06T 15/20
  See application file for complete search history.

(56) References Cited

U.S. PATENT DOCUMENTS

| | | | | |
|---|---|---|---|---|
| 8,350,827 | B2* | 1/2013 | Chung ................. | G02F 1/1368 345/102 |
| 8,411,140 | B2* | 4/2013 | Adelson ........................ | 348/135 |
| 8,497,884 | B2* | 7/2013 | Cholewin et al. ............ | 345/678 |
| 2005/0195156 | A1 | 9/2005 | Pihlaja et al. | |
| 2007/0070265 | A1* | 3/2007 | Jung .............................. | 349/65 |
| 2009/0128508 | A1* | 5/2009 | Sohn et al. ................... | 345/173 |
| 2009/0219261 | A1* | 9/2009 | Jacobson et al. ............. | 345/175 |
| 2009/0278812 | A1* | 11/2009 | Yasutake .............. | G06F 3/0488 345/173 |
| 2009/0303231 | A1* | 12/2009 | Robinet et al. ............... | 345/419 |
| 2010/0283743 | A1* | 11/2010 | Coddington ................. | 345/173 |
| 2010/0331051 | A1* | 12/2010 | Kim et al. .................... | 455/566 |
| 2011/0019058 | A1* | 1/2011 | Sakai et al. ............. | 348/333.01 |
| 2011/0055753 | A1* | 3/2011 | Horodezky ......... | G06F 3/04883 715/810 |
| 2011/0072394 | A1* | 3/2011 | Victor .......................... | 715/821 |
| 2011/0126156 | A1* | 5/2011 | Krishnaraj et al. ........... | 715/828 |
| 2011/0205189 | A1* | 8/2011 | Newton ........................ | 345/175 |

FOREIGN PATENT DOCUMENTS

| | | |
|---|---|---|
| CN | 101533649 | 9/2009 |
| JP | H 11-341114 | 12/1999 |

OTHER PUBLICATIONS

PCT/CN2010/079507 International Search Report dated Mar. 17, 2011 (2 pages).
First Examination Report dated Apr. 23, 2012 in corresponding Chinese Application No. 200910242423.3 filed on Dec. 11, 2009 (8 pages including English translation).
Second Examination Report dated Nov. 14, 2012 in corresponding Chinese Application No. 200910242423.3 filed on Dec. 11, 2009 (13 pages including English translation).
Second Examination Report dated Jan. 15, 2013 in corresponding Chinese Application No. 200910241771.9 filed Dec. 7, 2009.
Chinese First Office Action with English Translation for related Application No. 200910241771.9 dated Apr. 24, 2012, 7 pages.
Chinese Rejection Decision with English Translation for related Application No. 200910241771.9 dated Aug. 6, 2013, 13 pages.
Chinese Third Office Action with English Translation for related Application No. 200910242423.3 dated Apr. 23, 2013, 12 pages.
Chinese Rejection Decision with English Translation for related Application No. 200910242423.3 dated Sep. 16, 2013, 14 pages.

* cited by examiner

METHOD AND TERMINAL DEVICE FOR OPERATION CONTROL OF OPERATION OBJECT

TECHNICAL FIELD

The present invention relates to a hand-held terminal device, more specifically, to a method of operation control for an operation object and a terminal device.

BACKGROUND

More and more hand-held devices require a light-weight, thin and larger screen, and a touch technique is used more and more widely in a hand-held device. With the enhancement of computing capability of the hand-held device, it is common to display a 3D image such as display of a street view and display of a cubic menu.

For the display of these 3D images, translating and rotating are two types of operations used commonly, and can be implemented by touching. However, in a planar touching device, usually, only one type of operation can be supported at same time, i.e., only translating operation can be implemented or only rotating operation can be implemented. If another type of operation is desired, a switch should be done. Otherwise, an operation may cause interpretations.

FIG. 1 is an effect diagram illustrating the translating operation implemented by using a touching screen in an existing hand-held device.

FIG. 2 is an effect diagram illustrating the rotating operation implemented by using a touching screen in an existing hand-held device.

However, the translating operation and the rotating operation can not be implemented at same time. If an effect of both the translating operation and the rotating operation is desired, after being implemented a translating operation, the operation object should be switched to a rotating operation mode in which a rotating operation is implemented, then, the operation object is rotated at a position to which the operation object is translated.

Such operation manner is inconvenient considerably and can not meet with a user's requirement.

Also, in a touching screen with full touching control, for an existing terminal device, since an area of the touching screen is limited considerably, resulting in that a part of the touching screen will be covered when a user implements a touching control, the user's viewing is affected.

SUMMARY

A technical problem to be solved by the present invention is to provide a method of operation control for an operation object and a terminal device, which can implement two types of operations at same time, the method and terminal device can obtain an operation effect for a case in which two types of operations are implemented at same time.

A technical problem to be solved by the present invention is to provide a terminal device and an input method, which will not affect a display effect of a user's screen when implementing a touching control.

To solve the above technical problems, an embodiments of the present invention is to provide a method of operation control for an operation object, the method includes: obtaining a first operation direction and a second operation direction of an operation object; determining an operation corresponding to a direction combination relationship of the first operation direction and the second operation direction; and implementing the operation on the operation object.

Preferably, the step of determining the operation corresponding to the direction combination relationship of the first operation direction and the second operation direction specifically is: determining the operation corresponding to the direction combination relationship of the first operation direction and the second operation direction according to an operation type of the operation object.

Preferably, when the operation type of the operation object is an operation on a three dimensional operation object, the step of determining the operation corresponding to the direction combination relationship of the first operation direction and the second operation direction according to the operation type of the operation object specifically is: determining the operation as translating the three dimensional operation object in the first operation direction or the second operation direction when the first operation direction and the second operation direction are same; or rotating the three dimensional operation object with respect to a perpendicular line of a track formed by the first operation direction and the second operation direction as an axis when the first operation direction and the second operation direction are opposite.

Preferably, when the operation type of the operation object is an operation on a plane operation object, the step of determining the operation corresponding to the direction combination relationship of the first operation direction and the second operation direction according to the operation type of the operation object specifically is: determining the operation as translating the plane operation object in the first operation direction or the second operation direction when the first operation direction and the second operation direction are same; or determining the operation as an operation of magnifying wholly the plane operation object when the first operation direction and the second operation direction are opposite.

Preferably, when the operation type of the operation object is an operation on a window operation object, the step of determining the operation corresponding to the direction combination relationship of the first operation direction and the second operation direction according to the operation type of the operation object specifically is: determining the operation as an operation of opening the window operation object when the first operation direction and the second operation direction are same and are in a first direction; or determining the operation as an operation of maximizing the window operation object when the first operation direction and the second operation direction are same and are in a second direction; or determining an operation whose direction is opposite to that of the operation of maximizing the window operation object as an operation of reducing the window operation object, wherein the first direction and the second direction are different.

Preferably, when the first operation direction and the second operation direction are same, the operation is determined as a first operation; when the first operation direction and the second operation direction are opposite, the operation is determined as a second direction.

Preferably, the above method further includes: a third operation of selecting a locating point on the operation object; implementing the first operation of moving way from the locating point with respect to the locating point, implementing an operation of magnifying with respect to the locating point.

Embodiments of the present invention further provide a terminal device comprising a case and a first operation unit provided on the case, and the terminal device further comprising: a second operation unit provided on the case, the first operation unit obtaining a first operation direction of a operation object and the second operation unit obtaining a second operation direction of the operation object; a processing unit, which determines a operation corresponding to a direction combination relationship of the first operation direction and the second operation direction; an operation implementing unit, which implements the operation on the operation object, and outputs and displays a result of implementing the operation.

Preferably, the processing unit including: a first processing sub-unit, which determines an operation type of the operation object according to a property of the operation; a second processing sub-unit, which determines the operation corresponding to the direction combination relationship of the first operation direction and the second operation direction.

Preferably, when the first sub-processing unit determines the operation type of the operation object is an operation on a three dimensional operation object, the second sub-processing unit is used specifically configured to: determine the operation as translating the three dimensional operation object in the first operation direction or the second operation direction when the first operation direction and the second operation direction are in a same straight line and are same; or rotate the three dimensional operation object with respect to a perpendicular line of a track formed by the first operation direction and the second operation direction as an axis when the first operation direction and the second operation direction are opposite.

Preferably, when the first sub-processing unit determines the operation type of the operation object as an operation on a plane operation object, the second sub-processing unit is used specifically to: determine the operation as an operation of translating the plane operation object in the first operation direction or the second operation direction when the first operation direction and the second operation direction are same; or determine the operation as an operation of magnifying wholly the plane operation object when the first operation direction and the second operation direction are opposite.

Preferably, when the first sub-processing unit determines the operation type of the operation object as an operation on a window operation object, the second sub-processing unit is specifically used to: determine the operation as an operation of opening the window operation object when the first operation direction and the second operation direction are same and are in a first direction; or determine an operation whose direction is opposite to the direction of the operation of opening the window operation object as an operation of closing the window operation object; or determine the operation as an operation of maximizing the window operation object when the first operation direction and the second operation direction are same and are in a second direction; or determine an operation whose direction is opposite to the direction of the operation of maximizing the window operation object as an operation of reducing the window operation object.

Preferably, the first operation unit is provided at a first position of the case; the second operation unit is provided at a second position opposite to the first position of the case.

Preferably, when the first operation direction and the second operation direction are same, the operation is a first operation, when the first operation direction and the second operation direction are opposite, the operation is a second operation.

Preferably, the first operation unit includes: a image collection unit and a transparent window provided on a image collection path of the image collection unit, a first surface of the transparent window being away from the image collection unit spaces the image collection unit by a certain distance to form a space, wherein the image collection unit is used to pick up an image when a pointer contacts with the first surface of the transparent window, and the processing unit is used to compute a trace of the pointer according to the image, and obtain the first operation direction of the operation object according to the trace.

Preferably, the first operation unit further includes at least one of light emitting device which emits light into the space; the light emitting device and the image collection unit are located on the same side of the first surface.

Preferably, the image collection unit has a photograph mode or a locating mode, when the image collection unit operates in the locating mode, the light emitting device is in a enabling state.

Preferably, the light emitting device is set fixedly, its light emitting direction is toward the transparent window.

Preferably, the light emitting device is set fixedly, the first operation unit further includes a optical device which is provided in the light emitting direction of the light emitting device, and directs the light emitted by the light emitting device to the space.

Preferably, the light emitting device is set fixedly, the light emitting device is a loop light emitting body provided surrounding the image collection unit.

Preferably, the light emitting device is provided in the transparent window, and is located at one end of the transparent window, and its light emitting direction is toward to the other end of the transparent window.

Preferably, the light emitting device is adjustable, the light emitting device includes specifically a light emitting unit, an angle adjusting module which is connected to the light emitting unit and adjusts the light emitting body so that the light emitting emits light toward the space when the image collection unit operates in the locating mode.

Preferably, the light emitting device is adjustable, the light emitting device includes specifically a light emitting body and a optical device which adjusts a light path of the light emitting body so that the light emitting body emits light toward the space when the image collection unit operates in the locating mode, and adjusts the light path of the light emitting body so that the light emitting body emits light to a space outside the transparent window.

Preferably, when the image collection unit operates in the locating mode, the optical device is located in the light path of the light emitting body, the light emitted by the light emitting device passes through the light emitting body and is emitted into the space, when the image collection unit operates in the photograph mode, the optical device is located outside the light path of the light emitting body, the light emitted by the light emitting body transmits through the transparent window and is emitted outside.

Preferably, the processing unit is further used to adjust a light intensity of the light emitting device.

Preferably, the second operation unit includes a image collection unit and a transparent window provided in an image collection channel of the image collection unit, a first surface of the transparent window being away from the image collection unit spaces the image collection unit by a certain distance to form a space; wherein the image collection unit is used to pick up an image when a pointer contacts with the first surface of the transparent window, and the processing unit is used to compute a track of the pointer according to the image and obtain a second operation direction of the operation object according to the track.

Embodiments of the present invention further provide a method of operation control for an operation object which includes at least one of display object, comprising: determining a priority of the display object; receiving a instruction on a first operation direction and a second operation direction of the display object; displaying display information with a current priority and display information with a priority lower than the current priority of the display object.

Embodiments of the present invention further provide a terminal device, comprising: a storage unit for storing an operation object including at least one of display object; a processing unit for determining a priority of the display object, receiving a instruction on a first operation direction and a second operation direction of the display object and generating a instruction to display information with a current priority and display information with a priority lower than the current priority of the display object; a display unit for displaying the display information of the display object according to the instruction.

Embodiments of the present invention further provide a terminal device, comprising: a case; a main board provided in the case; a operation unit provided on the case and connected to the main board; and a processing unit provided in the case and connected to the main board, it is characterized by the operation unit including: an image collection unit; and a transparent window provided on an image collection channel of the image collection unit, a first surface of the transparent window being away from the image collection unit spaces the image collection unit by a certain distance to form a space, wherein the image collection unit is used to pick up an image when a pointer contacts with the first surface of the transparent window, and the processing unit is used to compute a trace of the pointer and generating an input instruction corresponding to the track.

Embodiments of the present invention further provide an input method which is applied to a terminal device described above, it is characterized by, comprising: collecting an image when a pointer contacts with a first surface of the transparent window; computing a trace of the pointer according to the image, and generating an input instruction corresponding to the trace.

The advantageous effect of the above technical solution of the present invention is described as follows.

In the foregoing solution, a first operation direction and a second operation direction of a operation object are obtained at same time, a corresponding operation is determined according to a direction combination relationship of the first operation direction and the second operation direction, which realizes that two types of operations are implemented at same time, and can obtain an operation effect achieved by implementing two types of operations at same time.

In the foregoing solution, an image of a pointer on a surface of a transparent window is photographed by using an existing image collection unit, and is further analyzed to determine a position of the pointer, it is not necessary to add an additional device, an implementation cost is small, and it is very important for a small-size portable device.

In the foregoing solution, since a pointer does not slip on a surface of a touching screen, but is operated on a transparent window, which does not affect a user's viewing the displayed content.

DETAILED DESCRIPTION

To make a technical problem to be solved by the present invention, technical solution and advantage of the present invention clearer, a detailed description will be made in conjunction with the drawings and the specific embodiments.

Figure 1:
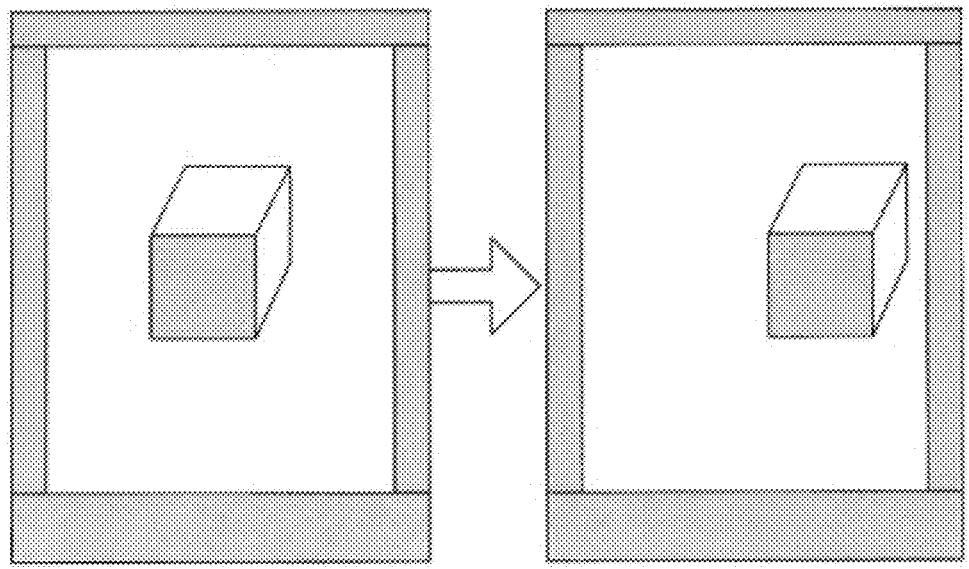
FIG. 1 is an effect diagram illustrating a translating operation implemented by using a touching screen of an existing hand-held device therein.
Figure 2:
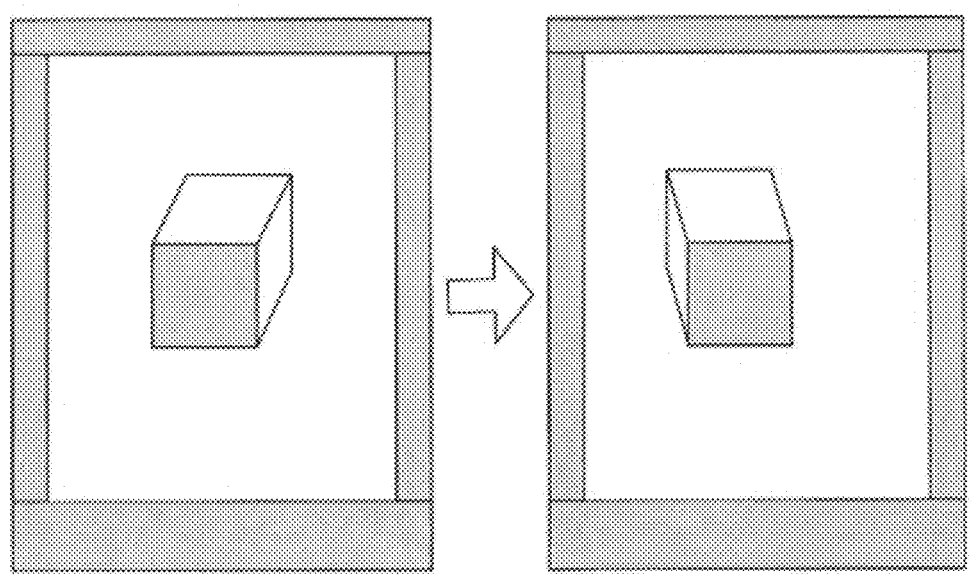
FIG. 2 is an effect diagram illustrating a rotating operation implemented by using a touching screen of an existing hand-held device therein.
Figure 3:
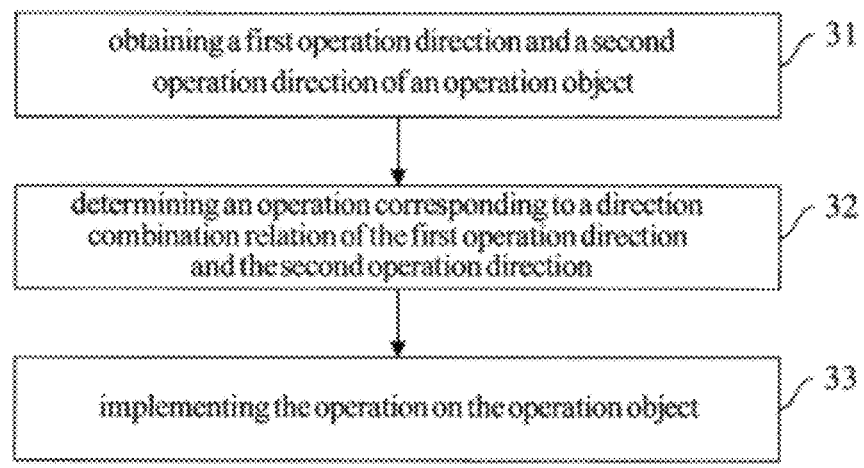
FIG. 3 is flow chart of a method of operation control for an operation object according to the present invention.

As illustrated in FIG. 3, a method of operation control for an operation object comprise:

Step 31, obtaining a first operation direction and a second operation direction of an operation object;

Step 32, determining an operation corresponding to a direction combination relationship of the first operation direction and the second operation direction;

Step 33, implementing the operation on the operation object.

The method enables two types of operations to be implemented simultaneously by obtaining a first operation direction and a second operation direction of an operation object simultaneously and determining a corresponding operation according to a direction combination relation of the first operation direction and the second operation direction.

Wherein, when the above step 32 is specifically implemented, the operation corresponding to the direction combination relation of the first operation direction and the second operation direction is determined according to an operation type of the operation object.

Wherein, the operation type of the operation object may include: an operation on a three dimensional operation object, an operation on a plane operation object or an operation on a window operation object, but is not limited to these, it is also possible that operations in respective directions are defined for other operation objects according to requirements, however, the implementation way thereof is similar to that of the above several types of operation objects.

Operation Type 1:

When an operation type of the operation object is an operation on a three dimensional operation object, the step of determining the operation corresponding to the direction combination relation of the first operation direction and the second operation direction according to the operation type of the operation object is specifically classified into the following several cases:

(1) when the first operation direction and the second operation direction are same (i.e., when the tracks formed by the first operation direction and the second operation direction are parallel and the directions thereof are same, or when the tracks are considered as being parallel, that is, there may be a certain angle between the tracks of the first operation direction and the second operation direction, and the tracks become parallel after being processed by the system), the operation is determined as: translating the three dimensional operation object in the first operation direction or the second operation direction;

For example, in a coordinate system in which the three dimensional operation object is located, the first operation direction and the second operation direction are along X axis or Y axis and the directions thereof are same, the operation is: a translating operation in the first operation direction or the second operation direction; by way of example:

TABLE 1

| first operation direction | second operation direction | | | |
|---|---|---|---|---|
| | X axis negative direction | X axis positive direction | Y axis positive direction | Y axis negative direction |
| X axis negative direction | translating wholly toward X axis negative direction | | | |
| X axis positive | | translating wholly toward | | |

TABLE 1-continued

| first operation direction | second operation direction | | | |
|---|---|---|---|---|
| | X axis negative direction | X axis positive direction | Y axis positive direction | Y axis negative direction |
| direction | | X axis positive direction | | |
| Y axis positive direction | | | translating wholly toward Y axis positive direction | |
| Y axis negative direction | | | | translating wholly toward X axis negative direction |

Certainly, Table 1 exemplifies only the move operation in X axis direction or Y axis direction, if the move in the first operation direction and the second operation direction is not the one in the proper X axis direction or Y axis direction, it is also possible as long as the first operation direction and the second operation direction are in the same direction, for example, in a direction of an angular bisector of X axis and Y axis, and a direction in an angular bisector of the angular bisector and X axis or an angular bisector of the angular bisector and Y axis, and the like, all operations in same direction are appropriate.

(2) when the first operation direction and the second operation direction are opposite, the operation is determined as: performing rotation operation with respect to a perpendicular line of the track formed by the first operation direction and the second operation direction as an axis (i.e., when the tracks formed by the first operation direction and the second operation direction are parallel or parallel approximately, and the directions thereof are opposite, wherein being parallel approximately refers to the case in which there may be an angle between the tracks of the first operation direction and the second operation direction, however, the system considers the first operation direction and the second operation direction being parallel), for example, performing rotation operation in the first operation direction or rotating in the second operation direction with respect to a perpendicular line of track formed by the first operation direction and the second operation direction as an axis.

For example, in a coordinate system in which the three dimensional operation object is located, when the first operation direction and the second operation direction are both along the X axis or Y axis and the directions thereof are different, the operation is: performing rotation operation the three dimensional operation object in the first operation direction with the X axis as the center or rotating the three dimensional operation object in the second operation direction with respect to the Y axis as the center; by way of example:

TABLE 2

| first operation direction | second operation direction | | | |
|---|---|---|---|---|
| | X axis negative direction | X axis positive direction | Y axis positive direction | Y axis negative direction |
| X axis negative direction | | rotating toward X axis negative direction with respect to the Y axis as the | | |

TABLE 2-continued

|  | second operation direction | | | |
| --- | --- | --- | --- | --- |
| first operation direction | X axis negative direction | X axis positive direction | Y axis positive direction | Y axis negative direction |
| X axis positive direction | rotating toward X axis positive direction with respect to the Y axis as the center, facing the user | center, facing the user | | |
| Y axis positive direction | | | | rotating toward Y axis positive direction with respect to the X axis as the center, facing the user |
| Y axis negative direction | | | rotating toward Y axis negative direction with respect to the X axis as the center, facing the user | |

Certainly, Table 2 exemplifies only the rotating operation in X axis direction or Y axis direction, if the move in the first operation direction and the second operation direction is not the one in the proper X axis or Y axis direction, it is also possible as long as the first operation direction and the second operation direction are opposite, for example, a direction in an angular bisector of X axis and Y axis, and a direction in an angular bisector of the angular bisector and X axis or an angular bisector of the angular bisector and Y axis, and the like, all operations in opposite direction is appropriate.

(3) When the first operation direction and the second operation direction are neither same nor opposite (i.e., the tracks formed by the first operation direction and the second operation direction intersect each other), the operation is determined as: rotating the three dimensional operation object with respect to a perpendicular of the track formed by the first operation direction and a perpendicular of the track formed by the second operation direction as an axis, for example, rotating with respect to a perpendicular of the track formed by the first operation direction as an axis, while rotating with respect to a perpendicular of the track formed by the second operation direction as an axis.

For example, in a coordinate system in which the three dimensional operation object is located, when the first operation direction is X axis direction and the second operation direction is Y axis direction, the operation is rotating in the first operation direction with the X axis as the center, while rotating in the second operation direction with the Y axis as the center; by way of example:

TABLE 3

|  | second operation direction | | | |
| --- | --- | --- | --- | --- |
| first operation direction | X axis negative direction | X axis positive direction | Y axis positive direction | Y axis negative direction |
| X axis negative direction | | | Rotating toward X axis negative direction with respect to Y axis as the center, facing a user; Meanwhile, Rotating toward Y axis negative direction with respect to X axis as the center, facing a user | Rotating toward X axis negative direction with respect to Y axis as the center, facing a user; Meanwhile, Rotating toward Y axis positive direction with respect to X axis as the center, facing a user |

TABLE 3-continued

| first operation direction | second operation direction | | | |
|---|---|---|---|---|
| | X axis negative direction | X axis positive direction | Y axis positive direction | Y axis negative direction |
| X axis positive direction | | | Rotating toward X axis positive direction with respect to Y axis as the center, facing a user; Meanwhile, Rotating toward Y axis negative direction with respect to X axis as the center, facing a user | Rotating toward X axis positive direction with respect to Y axis as the center, facing a user; Meanwhile, Rotating toward Y axis positive direction with respect to Y axis as the center, facing a user |
| Y axis positive direction | Rotating toward Y axis positive direction with respect to X axis as the center, facing a user; Meanwhile, Rotating toward X axis positive direction with respect to Y axis as the center, facing a user | Rotating toward Y axis positive direction with respect to X axis as the center, facing a user; Meanwhile, Rotating toward X axis negative direction with respect to Y axis as the center, facing a user | | |
| Y axis negative direction | Rotating toward Y axis negative direction with respect to X axis as the center, facing a user; Meanwhile, Rotating toward X axis positive direction with respect to Y axis as the center, facing a user | Rotating toward Y axis negative direction with respect to X axis as the center, facing a user; Meanwhile, Rotating toward X axis negative direction with respect to Y axis as the center, facing a user X | | |

Certainly, the X axis and Y axis in Table 3 can be defined as the respective components of any two directions of different dimensions in the X axis and Y axis.

In addition, if the track formed by the first operation direction or the track formed by the second operation direction is a curve, the system processes these curves by mapping them to straight lines, the detailed way of mapping can be: determining a straight line by a start point and a end point of the track, or mapping the curve to a plurality of pieces of successive straight lines, which are then processed sequentially.

Operation Type 2:

When the operation type of the operation object is an operation on a plane operation object, the step of determining the operation corresponding to the direction combination relation of the first operation direction and the second operation direction can be specifically classified into the following several cases:

(1) When the first operation direction and the second operation direction are same, the operation is determined as translating the plane operation object in the first operation direction or the second operation direction.

The detailed way of the translating operation on the plane operation object is same as that of the operations described in the above Table 1, the detailed description thereof will be provided again.

The translating operation on the plane operation object is explained by the way of example: for example, the plane operation object is a web page or a plane image, the web page is selected simultaneously by the above operations in the first operation direction and second operation direction, and moves in same direction so that the web page moves according to the first operation direction and the second operation direction to realize a function of a scroll bar on the web page when the web page is displayed on a small screen of a hand-hold device. When the system detects the operation in the first operation direction and the operation in the second operation direction, the web page is moved along the first operation direction and the second operation direction, and a clicking trigger operation corresponding to the operation along the first operation direction is ignored, so that the problem for triggering a web linkage by mistake can be solved.

(2) When the first operation direction and the second operation direction are opposite, the operation is determined as an operation of magnifying wholly the plane operation object.

For example, the first operation direction is a direction from the X axis negative direction to the X axis positive direction (i.e., a direction from left to right viewed from a user's point), at same time, the second operation direction is a direction from the X axis positive direction to the X axis negative direction (i.e., a direction from right to left viewed from a user's point), which represents magnifying wholly the plane operation object; or The first operation direction is a direction from the Y axis negative direction to the Y axis positive direction (i.e., a direction from bottom to top viewed from a user's point), at same time, the second operation direction is a direction from the Y axis positive direction to the Y axis negative direction (i.e., a direction from top to bottom viewed from a user's point), which represents magnifying wholly the plane operation object; or The first operation direction is a first direction along an angular bisector of X axis and Y axis (i.e., a direction from bottom left to top right viewed from a user's point), at same time, the second operation direction is a second direction along an angular bisector of X axis and Y axis (i.e., a direction from top right to bottom left viewed from a user's point), which represents magnifying wholly the plane operation object.

The direction combination relation of the first operation direction and the second operation direction is not limited to these, and can represent magnifying wholly as long as their direction are opposite.

(3) An operation whose direction is opposite to that of the operation of magnifying wholly the plane operation object is determined as an operation of reducing wholly the plane operation object.

For example, on the basis of the operation corresponding to the direction combination relation defined in the above item (2), at the same time, it is defined that:

the first operation direction is a direction from the X axis positive direction to the X axis negative direction (a direction from right to left viewed from a user's point), at same time, the second operation direction is a direction from the X axis negative direction to the X axis positive direction (a direction from left to right viewed from a user's point), which represents an operation of reducing wholly the plane operation object;

similarly, the first operation direction is a direction from the Y axis positive direction to the Y axis negative direction (a direction from top to bottom viewed from a user's point), at same time, the second operation direction is a direction from the Y axis negative direction to the Y axis positive direction (a direction from bottom to top viewed from a user's point), which represents an operation of reducing wholly the plane operation object;

similarly, the first operation direction is a second direction along an angular bisector of X axis and Y axis (a direction from bottom right to top left viewed from a user's point), at same time, the second operation direction is a first direction along an angular bisector of X axis and Y axis (i.e., a direction from bottom left to top right viewed from a user's point), which represents an operation of reducing wholly the plane operation object.

Certainly, the operation of reducing the plane operation object is not limited to correspond to the above direction combination relation of the first operation direction and second operation direction, all operations which can represent an operation whose direction is opposite to that of the operation of magnifying wholly can be defined as the operation of reducing wholly.

Certainly, an operation of rotating the plane operation object on a plane also can be defined, it is enough as long as the combination relation of the first operation direction and the second operation direction to which the rotating operation corresponds is different from the direction of the operation defined above, the description thereof will not be provided again.

In addition, besides the operation of magnifying wholly the plane operation object, an operation of magnifying partially can be implemented on the plane operation object, for example, the operation of magnifying partially the plane operation object can be implemented by on implementing the operation in the second operation direction on the plane operation object, that is, locating a part to be magnified partially on the second operation object by the second operation and moving it in the second operation direction. Specifically speaking, the detailed process of magnifying partially the plane operation object is as follows, generating a control point for magnifying partially; generating an area to be magnified locally correspondingly according to the control point for magnifying partially; controlling a position of the control point for magnifying partially by the second operation direction; magnifying a display content on which the control point is located and displaying it in an area magnified partially.

Particularly, when an operation is implemented on a non-display area along the second operation direction, the user's operation can not be covered, which can avoid a problem of triggering by mistake.

Operation 3:

When the operation type of the operation object is an operation on a window operation object, the step of determining the operation corresponding to the direction combination relation according to the operation type of the operation object is specifically classified into the following several cases:

(1) When the first operation direction and the second operation direction are same and are in a first direction, the operation is determined as an operation of opening the window operation object;

For example, that the first operation direction and the second operation direction are along a direction from the X axis negative direction to the X axis positive direction at same time represents the operation of opening a program. Certainly, the combination relation of the first operation direction and the second operation direction is not limited to these, and further can be any other two same operation directions.

(2) An operation whose direction is opposite to that of the operation of opening the window operation object is determined as an operation of closing the window operation object;

For example, on the basis of the operation of magnifying the window defined in the above item (1), that the first operation direction and the second operation direction are along a direction from the X axis positive direction to the X axis negative direction represents the operation of closing the window. Certainly, the combination relation of the first operation direction and the second operation direction is not limited to these, and all operations which can represent an operation whose direction opposite to that of the operation of magnifying can be defined as the operation of closing.

(3) When the first operation direction and the second operation direction are same and are in a second direction, the operation is determined as an operation of maximizing the window operation object, wherein the first direction and the second direction are different, such that, it can be avoided that the same operation corresponds to different operation results.

For example, that the first operation direction and the second operation direction are a first motion direction along an angular bisector of the X axis and the Y axis at same time (i.e., moving from bottom left inclined to top right at the same time viewed from the user's point) represents the operation of maximizing the window. Certainly, the combination relation of the first operation direction and the second operation direction is not limited to these, and further can be any other two same operation directions.

(4) An operation whose direction is opposite to that of the operation of maximizing the window operation object is determined as an operation of reducing the window operation object;

For example, on the basis of the example listed in the above item (3), that the first operation direction and the second operation direction are along a second motion direction along an angular bisector of the X axis and the Y axis at same time (i.e., moving from top right inclined to bottom left at the same time viewed from the user's point) represents the operation of minimizing the window.

In the above method of the present invention, what operation implemented on the operation objection can be determined according to the direction combination relation of the first operation direction and the second operation direction, which achieves an effect of implementing two types of operations on the same operation object at the same time (for example, implementing translating and rotating operation at same time).

In addition, the above method embodiment of the present invention further includes:

A third operation of selecting a locating point on the operation object.

Figure 10:
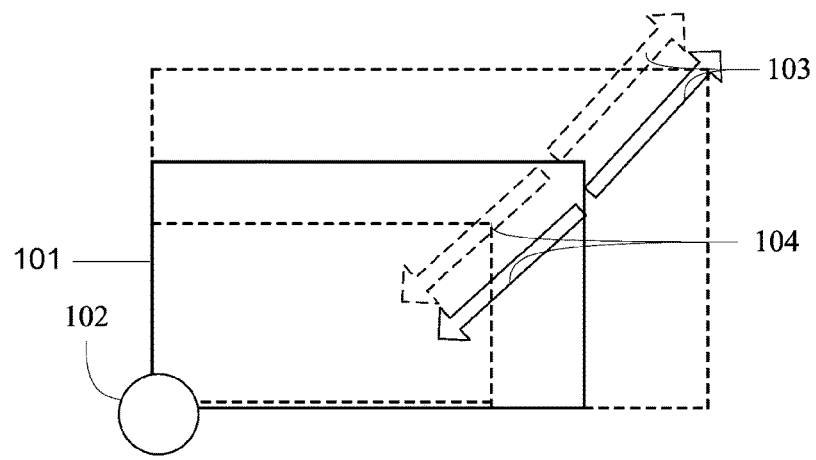
FIG. 10 is a schematic figure illustrating magnifying of an operation object at a fixed point by the terminal device illustrated in FIG. 4.

A first operation of moving the operation object away from the locating point with respect to the locating point, magnifying the operation with respect to the position point, moving it approaching the locating point with respect to the locating point, and reducing it with respect to the position point. The detailed process is shown in FIG. 10, selecting a locating point 102 of the operation object 101, at the same time, moving 103 the operation object away from the locating point in the same direction, magnifying the operation object with respect to the locating point; while implementing an operation 104 whose direction is opposite to that of the operation of magnifying to reduce the operation object with respect to the locating point. The operation object herein can be a three dimensional operation object, a plane operation object or other operation object such as a window and the like.

In the above embodiment of the present invention, the three dimensional operation object can be a three dimensional object, a street view map or a cubic menu and the like, the plane operation object can be a plane image on a screen and the like, the window operation object can be a window to which various of application programs correspond. Further, the above method of the present invention also can determine automatically from the current scene according to validity of the operation type of the operation object, for example, when the display content on the current window is a 3D object, the meanings of a touching motion is defined according to the operation type 1 of the above three dimensional operation object; when the display content on the current window is a plane image (for example, a picture), the meanings of the touching motion is defined according to the operation type 2; when the display content on the current window is other content or program manager, the meanings of the touching motion is defined according to the operation type 3.

Figure 4:
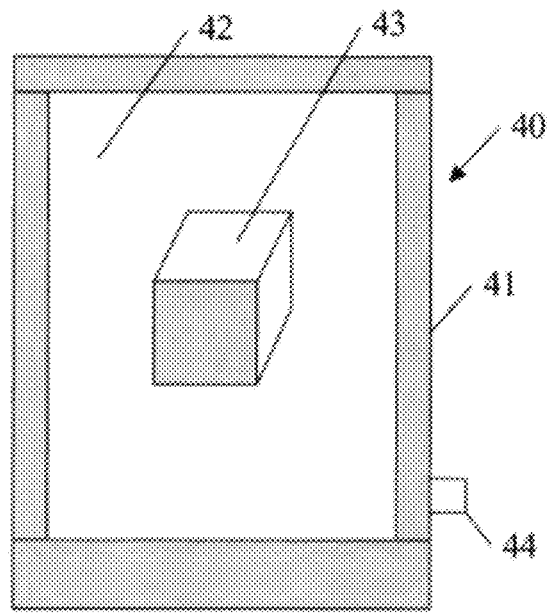
FIG. 4 is a figure illustrating a structure of a terminal device according to the present invention.

As illustrated in FIG. 4, an embodiment of the present invention further provide a terminal device 40 which comprises a case 41 and a first operation unit 42 provided on the case 41, and further comprises: a second operation unit 44 provided on the case 41;

The first operation unit 41 for obtaining a first operation direction of an operation object 43;

The second operation unit 44 for obtaining a second operation direction of the operation object 43;

A processing unit (not shown), for determining an operation corresponding to a direction combination relation of the first operation direction and the second operation direction, the processing unit capable of being implemented by the processor of the terminal device when implemented specifically;

An operation implementing unit (not shown), for implementing the operation on the operation object, and outputting and displaying the result of the operation, the operation implementing unit capable of being implemented by the processor of the terminal device when implemented specifically.

Preferably, the above first operation unit and second operation unit are two operation units separated physically, the first operation unit can be provided at a first position of the case, the second operation unit is provided on a second position opposite to the first position of the case, which facilitates a user's operation, and is consistent with a user's normal operation practice.

For example, the first operation unit is a touching screen on the front of the terminal device (a surface facing a user), the second operation unit is a touch pad provided on the back of the terminal device. Certainly, the touch pad can be provided on the side of the terminal device, it is enough as long as it is separated physically from the first operation unit, that is, their positions are different.

Preferably, the terminal device can further comprises:

a display module (for example, which can be a display screen of the terminal device), for displaying an result of an operation implemented on the operation object. If the display screen is a touching screen, the display screen can serve as the above first operation unit while acting as a display unit.

Wherein, when implemented specifically, the processing unit can comprise:

a first processing sub-unit which determines an operation type of the operation object according to attribute character of the operation object;

a second processing sub-unit which determines an operation corresponding to a direction combination relation of the first operation direction and the second operation direction according to the operation type of the operation object.

When the first processing sub-unit determines the operation type of the operation object as an operation on a three dimensional operation object, the second processing sub-unit is specifically used to:

determine the operation as translating the three dimension operation object in the first operation direction or the second operation direction when the first operation direction and the second operation direction are same; or perform the rotation operation with respect to a perpendicular line of a track formed by the first operation direction and the second operation direction as an axis when the first operation direction and the second operation direction are opposite, for example, rotation operation in the first operation direction or the second operation direction with respect to a perpendicular line of a track formed by the first operation direction and the second operation direction as an axis; or determine the operation as rotating the three dimensional operation object with respect to a perpendicular line of a track formed by the first operation direction as an axis while rotating the three dimensional operation object with respect to a perpendicular line of a track formed by the second operation direction as an axis when the first operation direction and the second operation direction are neither same nor opposite.

EXAMPLE 1

Figure 5:
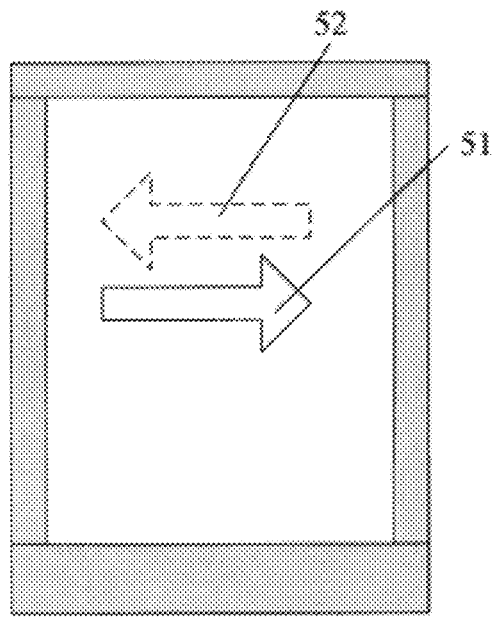
FIG. 5 is a schematic figure illustrating an operation direction in which a terminal device illustrated in FIG. 4 implements one type of operation on an operation object.
Figure 6:
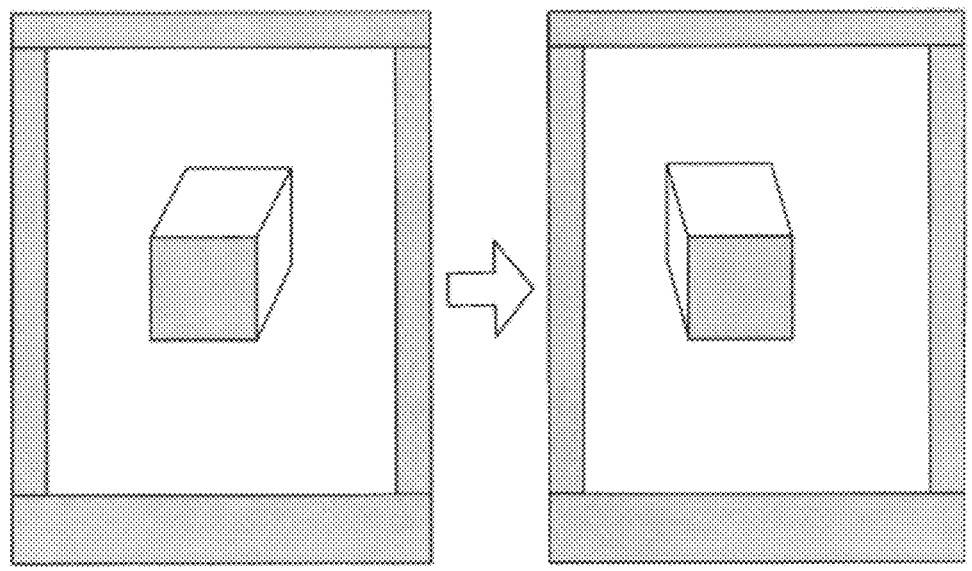
FIG. 6 is an effect diagram illustrating an operation on the operation object illustrated in FIG. 5.

As illustrated in FIG. 5, an arrow 51 represents a first operation direction, an arrow 52 represents a second operation direction, when the first operation direction and the second operation direction are opposite, the three dimensional operation object is rotated toward the X axis positive direction with respect to Y axis as the central facing the user, and a result of rotating the three dimensional operation object is illustrated in FIG. 6. The figure is only a schematic representation of the first operation direction and the second operation direction. Depending on the position at which the first operation unit and the second operation unit are provided, the first operation direction and the second operation direction can be superposed each other, or can not be superposed.

EXAMPLE 2

Figure 7:
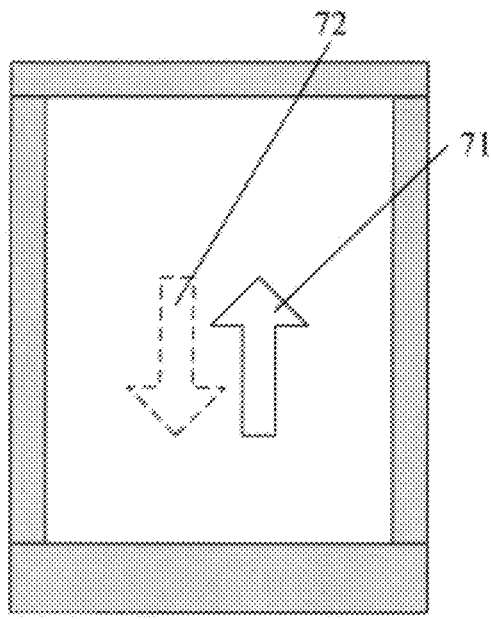
FIG. 7 is a schematic figure illustrating an operation direction in which a terminal device illustrated in FIG. 4 implements another type of operation on an operation object.
Figure 8:
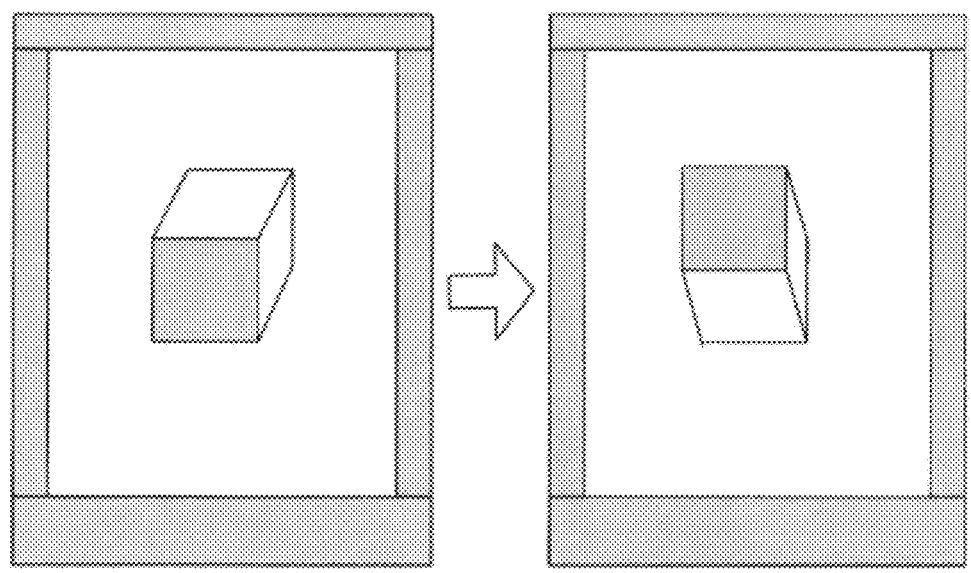
FIG. 8 is an effect diagram illustrating an operation on the operation object illustrated in FIG. 7.

As illustrated in FIG. 7, an arrow 71 represents a first operation direction, an arrow 72 represents a second operation direction, when the first operation direction and the second operation direction are opposite, the three dimensional operation object is rotated in the first operation direction or the second operation direction with respect to a perpendicular line of a track formed by the first operation direction and the second operation direction as an axis, the three dimensional operation object is rotated toward the Y axis positive direction with respect to X axis as the central facing the user, and a result of rotating the three dimensional operation object is illustrated in FIG. 8.

Certainly, FIGS. 5 and 6, or FIGS. 7 and 8 represent only one type of operation, other operations can be defined according to the above table 1, table 2 and table 3, the detailed thereof will not be provided again therein.

When the first processing sub-unit determines the operation type of the operation object as an operation on a plane operation object, the second processing sub-unit is specifically used to:

determine the operation as translating the plane operation object in the first operation direction or the second operation direction when the first operation direction and the second operation direction are same; or determine the operation as an operation of magnifying wholly the plane operation object when the first operation direction and the second operation direction are opposite; or determine an operation whose direction is opposite to that of the operation of magnifying wholly the plane operation object as reducing wholly the plane operation object.

Certainly, when the first processing sub-unit determines the operation type of the operation object as an operation on a plane operation object, the second processing sub-unit is further used to:

magnify a part to be magnified partially of the plane operation object which is selected by the second operation unit a predetermined number of times according to the part to be magnified partially of the plane operation object which is selected by the second operation unit and an operation of dragging the selected part by the second operation unit.

If the first operation direction of the terminal device is implemented on a touching screen of the terminal device and the second operation direction is implemented on a touch pad which is on a second position opposite to the position of the touching screen of the terminal device, it is only needed to touch the touch pad by a signal finger to locate a part of the plane operation object to be magnified partially, moving on the touch pad again trigger to magnifying a corresponding part to be magnified a fixed number of times, for example, if a linkage character on a web page is small, magnifying a linkage character area is implemented by locating the character area by the touch pad and moving on the touch pad, the times for magnifying can be preset.

Accordingly, if the text area or image magnified partially is required to be recover to the original size after being magnified, a normal web page or image can be recovered by double clicking the touch pad which represents a cancellation of magnification; or it is preset that the text area or image magnified partially are recovered to original size after settling on the screen for several seconds, or the magnified text area or image is recovered to normal when the touching pad is left, which can effectively resolve a problem that text on a hand-held device is too small so that it is difficult to click exactly a linkage which is desired to be opened by a finger.

Figure 9:
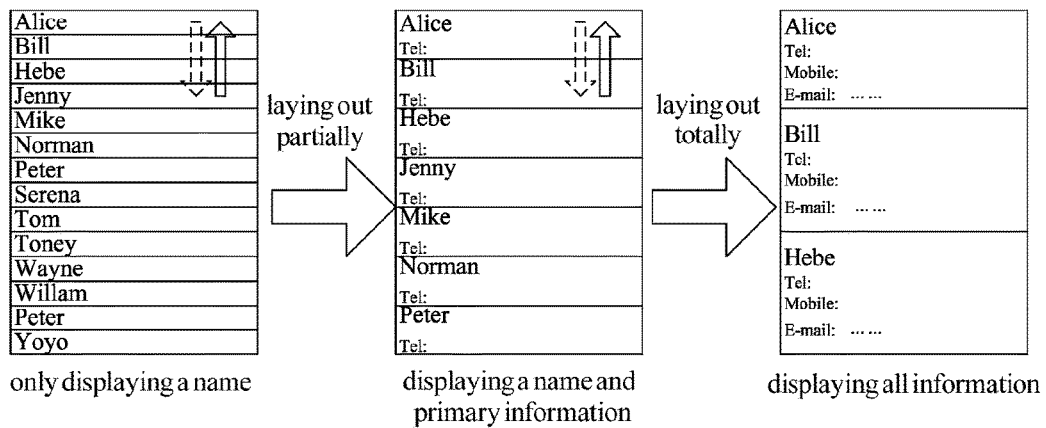
FIG. 9 is a schematic figure illustrating a direction of an operation on an operation object 'a address book' by the terminal device illustrated in FIG. 4 and opening of the address book.

Besides magnifying partially the text linkage area on a web page or magnifying an image partially, there can be the following application:

As illustrated in FIG. 9, an operation object is the one having a priority and moved in the opposite direction by the first operation unit and the second operation unit, i.e., when the first operation direction by the first operation unit and the second operation direction by the second operation unit are opposite, the operation object is opened on level by one level.

The detailed implementation process is as follows: the operation object includes at least one of display object, a display object includes display information with high priority and display information with low priority;

Determining a priority of the display object;

Receiving an instruction on the first operation direction and the second operation direction of the display object;

Displaying display information with current priority and display information with a priority lower than the current priority when the first operation direction and the second operation direction are opposite.

Wherein the priority of the display information may have three or more levels.

In addition, the above implementation process may further includes:

When an operation object comprised of several display objects is displayed after a display object is added, a display font of display information of each display object can be reduced so that display information with current priority and display information with a priority lower than the current priority can be displayed; the display font of the display information also can be maintained and the operation object is displayed by page.

Taking an operation object 'address book' as an example, each piece of entry of the address book is a display object, each piece of entry includes a plurality of pieces of contents with different priorities, for example, a name identifier information has a high priority, a telephone number information included in the name identifier information is one with a middle priority, other information included in the name identifier information is information with low priority such as fax information and postal address and the like.

Generally, a display module only displays display content with high priority, that is, only displays the name identifier information. In a user interface displaying the display object 'name', receiving a first operation and a second operation in opposite directions can specifically be: an operation obtained by the first operation unit is a downward motion with respect to the display screen, and an operation obtained by the second operation unit is a upward motion with respect to the display screen; or an operation obtained by the first operation unit is upward motion with respect to the display screen, and an operation obtained by the second operation unit is a downward motion on the address book with respect to the display screen.

The display module displays display content with high priority and content with middle priority, that is, displays the identifier information (name) and telephone information (primary content).

Further, the first operation and the second operation in opposite directions are received.

The display module displays display content with high priority, content with middle priority, and content with low priority, that is, displays all contents.

Accordingly, a embodiment of the present invention further provides a terminal device, the terminal device comprising:

a storage unit which stores an operation object having at least one of display object;

a processing unit which determines a priority of the display object, receives an instruction on a first operation direction and a second operation direction of the display object, generates an instruction to display the display information with current priority and the display information with a priority lower than the current priority of the display object;

a display unit which display the display information of the display object according to the instruction.

Specifically, the processing unit receives an instruction on the first operation direction and the second operation direction, and displays the display information with current priority and the display information with a priority lower than the current priority of the display object when the first operation direction and the second operation direction are opposite.

Preferably, when an operation object comprised of several display objects is displayed after a display object is added, the display font of the display information of each of display object can be reduced so that the display information with current priority and the display information with a priority lower than the current priority can be displayed; the display font of the display information also can be maintained and the operation object is displayed by page.

When the first processing sub-unit determines the operation type of the operation object as an operation on a window operation object, specifically, the second processing sub-unit is specifically used to:

determine the operation as an operation of opening the window operation object when the first operation direction and the second operation direction are same and are in a first direction; or determine an operation whose direction is opposite to that of the operation of opening the window operation object as an operation of closing the window operation object; or determine the operation as an operation of maximizing the window operation object when the first operation direction and the second operation direction are same and are in a second direction; or determine an operation whose direction is opposite to that of the operation of maximizing the window operation object as an operation of reducing the window operation object.

In addition, the terminal device according to the present invention can be further characterized by When the first operation direction by the first operation unit and the second operation direction by the second operation unit are same, the operation is a first operation; that is, the first operation is implemented on the operation object.

When the first operation direction by the first operation unit and the second operation direction by the second operation unit are opposite, the operation is a second operation, that is, the second operation is implemented on the operation object.

Preferably, when implemented, the first operation can further includes:

As illustrated in FIG. 10, a locating point of the operation object 101 is selected by the first operation unit, the operation object is moved 103 away from the locating point in same direction is implemented by the first operation unit and the second operation unit, the operation object is magnified with respect to the locating point; when an operation 104 whose direction is opposite to that of the operation of magnifying is implemented by the first operation unit and the second operation unit, the operation object is reduced with respect to the locating point. The operation object herein can be other operation objects such as a three dimensional operation object, a plane operation object or a window.

Certainly, the terminal device according to the present invention can further have an application according to other aspects.

When a plane image is magnified wholly, a locating point in the plane image can be selected firstly, and the plane image is magnified wholly with respect to the locating point, for example, a locating point in the plane image can be selected by the first operation unit, and then magnifying wholly the plane image with respect to the locating point can be implemented by moving in opposite direction by the first operation unit and the second operation unit, an operation whose direction is opposite to that of magnifying is reducing wholly.

The same operation can be applied to a plane operation object such as a web page, the operation method is same as those described above, detailed description thereof will not be provided.

It should be noted that all features of the above method embodiment are applicable to an embodiment of the terminal device, which can achieve the same technical effect as those of the above method.

The terminal device of the present invention can specifically be a hand-held device, specifically, can be a single hand operating multi-touch, when a user holds a hand-held device, generally, a thumb is above the device, four other fingers are below the device. When a user uses the hand-held device proposed according to the present solution, a touching operation can be implemented on the front by the thumb, and a touching operation can be implemented on the back by the forefinger.

The above solution of the present invention provides a new operation way by providing a second operation unit additionally on a terminal device, by which a user can translate and rotate an operation object simultaneously and can achieve an operation effect of translating and rotating the operation object simultaneously, and it is more convenient to control screen content interactively, and more interactive means are provided for the user. The above solution of the present invention can be applied widely to display a street view and a 3D picture and control interactively on a hand-held device.

However, it has been described above that: in a full touching controlling touching screen, for an existing terminal device, since an area of its touch screen is extremely limited, which results in that a user will cover a part of the touching screen when he/she implements a touching control, the user's viewing is affected.

Accordingly, for the first operation unit or the second operation unit in the above terminal device, for example, a touch pad provided on back or side of the terminal device, the configuration descried blow in which an image of a pointer on a surface of a transparent window is photographed by using an existing image collection unit and then is analyzed to determine a position of the pointer.

In an embodiment of the present invention, a transparent window is provided in an image collection channel of the image collection unit, a first surface of the transparent window is away from the image collection unit and spaces the image collection unit by a certain distance to form a space. The image collection unit picks up an image when a pointer contacts with the first surface of the transparent window to transfer it to a processing unit. The processing unit computes a track of the pointer and generates a corresponding input instruction according to the track. Since the pointer does not slide on a surface of a display screen, but is operated on a transparent window different from the display screen, and thus a user's viewing the displayed content will not be affected.

The terminal device according to an embodiment of the present invention comprises a main board, a processing unit and an image collection unit provided in the case and connected to the main board, wherein:

In an image collection channel of the image collection unit, a transparent window is provided, a first surface of the transparent window is away from the image collection unit and spaces the image collection unit by a certain distance to form a space.

The terminal device further comprises:

the image collection unit for collecting an image when a pointer contacts with the first surface of the transparent window;

The processing unit for computing a track of the pointer and generating a corresponding input instruction according to the track.

In an embodiment of the present invention, a first surface of the transparent window is away from the image collection unit and spaces the image collection unit by a certain distance to form a space, the space can be a part corresponding to the image collection channel of the transparent window, the space also can be the part corresponding to the image collection channel of the transparent window and a part between the bottom surface of the transparent window and the image collection unit.

How to compute the track of the pointer according to the image and generate the corresponding input instruction according to the track belong to a prior art, and a detailed description thereof will not be provided in the embodiment of the present invention.

Since the image collection unit is required to pick up an image when a pointer contacts with a first surface of the transparent window, the space between the first surface of the transparent window and the image collection unit should be irradiated by light, generally speaking, it can be implemented in the following means.

Figure 11:
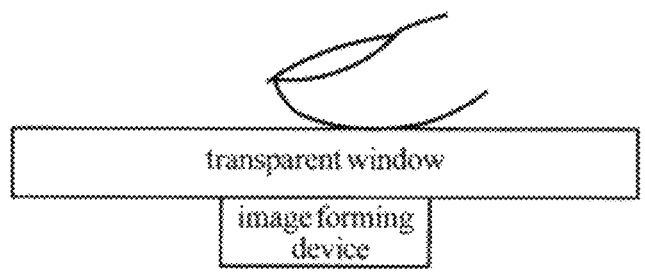
FIG. 11 is a schematic figure illustrating a relative position relation between a transparent window and an image collection unit in an embodiment of the present invention.

As illustrated in FIG. 11, the transparent window is set a bit larger, since a surface area of the transparent window is large, at this time, a pointer (a finger in FIG. 11) can only contact with a part of the transparent window, however, the light can still transmit other part not contacted with the pointer of the transparent window and enter into the space between the first surface of the transparent window and the image collection unit, and is captured by the image collection unit, therefore, a position of the pointer can be obtained by analyzing the image picked up by the image collection unit.

However, when an environment is very dark, or fully dark, or a contacting area of the pointer is larger than the surface area of the transparent window, the above implementation will result in that an imaging effect is very poor, to avoid this, in another implementation of the present invention, at least one of light emitting device is further provided in the terminal device, which is used to emit light into the space, is connected to the main board, and reflects the light emitted by the light emitting device when a pointer contacts with the first surface of the transparent window, and the image collection unit picks up the emitted light to form an image, therefore, a position of the pointer can be obtained by analyzing the image picked up by the image collection unit.

In a specific embodiment of the present invention, the image collection unit has two types of operation modes, a photograph mode and a locating mode, when the image collection unit operates in the locating mode, the processing unit is required to enable the light emitting device.

In a specific embodiment of the present invention, the transparent window can be a transparent window provided separately, also can be a transparent protection film in the image collection unit (for example camera) itself.

A further detailed description on the way of configuring the light emitting device described above will be provided below.

In a specific embodiment of the present invention, the light emitting device is set fixedly or is adjustable, which will be described below, respectively.

Figure 12:
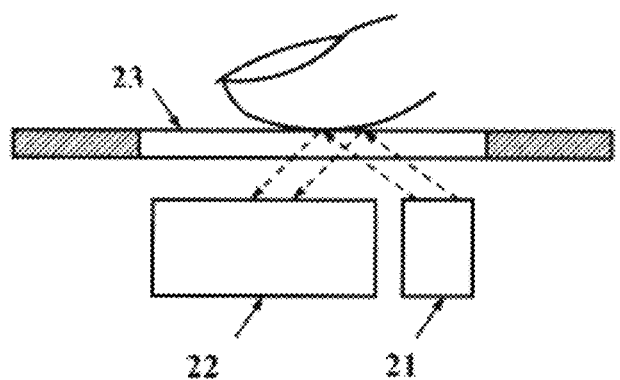
FIG. 12 to FIG. 15 are schematic figures illustrating a possible relative position relation among a light emitting device, an image collection unit and a transparent window when the light emitting device set fixedly is provided in an embodiment of the present invention.

As illustrated in FIG. 12, the light emitting device 21 is set fixedly, and an emitting light direction is toward the transparent window 23.

The light emitted by the light emitting device 21 is projected onto a finger touching the outside surface of the transparent window 23 and reflected into the image collection unit 22, and the image collection unit 22 forms an image recording the position of the finger.

Figure 13:
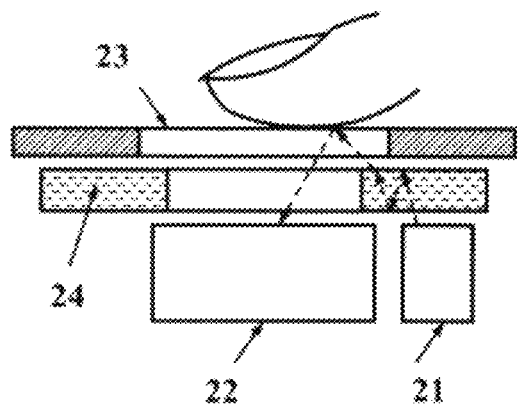

As illustrated in FIG. 13, the light emitting device 21 is set fixedly, the terminal device further includes an optical device 24 which is set in the light emitting direction of the light emitting device 21 and directs the light emitted from the light emitting device 21 to the space.

After being reflected a plurality of times in the optical device 24, the light emitting by the light emitting device 21 is projected outside the optical device 24, and projected onto a finger touching an outside surface of the transparent window 23, and reflected into the image collection unit 22, and the image collection unit 22 forms an image recording the position of the finger.

Figure 14:
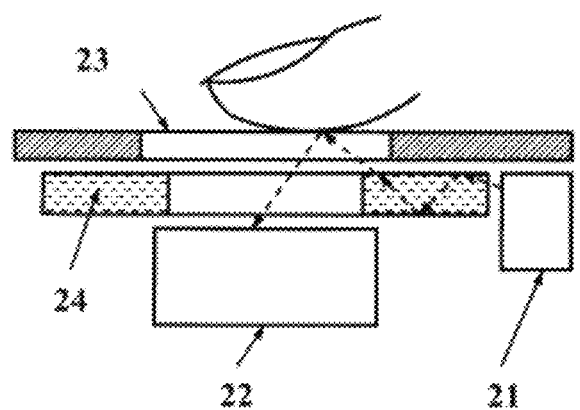

In FIG. 13, the optical device 24 is provided below the transparent window 23, however, there is other relative position between them, as illustrated in FIG. 14, the light emitting device 21 is set fixedly, the terminal device further includes a optical device 24 which is provided in the light emitting direction of the light emitting device 21 (the optical device 24 is provided on the optical device 24) and which directs the light emitted by the light emitting device 21 into the space.

After being reflected a plurality of times in the optical device 24, the light emitting by the light emitting device 21 is projected outside the optical device 24, and projected onto a finger touching the outside surface of the transparent window 23, and reflected into the image collection unit 22. The image collection unit 22 forms an image recording the position of the finger.

Figure 15:
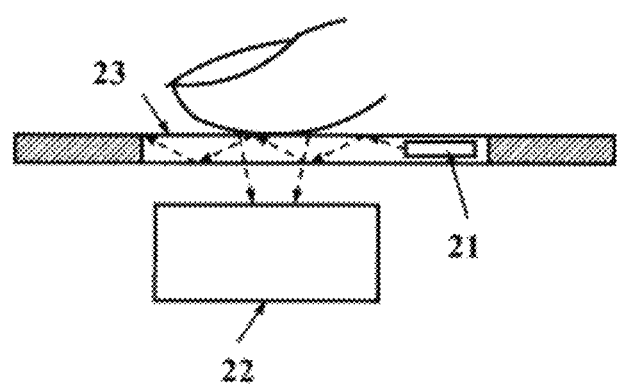

In respective implementation in FIGS. 12 to 14, the light emitting device all is located outside of the transparent window, and at the same side as the image collection unit, however, the light emitting device also can be provided inside the transparent window, as illustrated in FIG. 15, the light emitting device 21 is set fixedly inside the transparent window 23, being located at one end of the transparent window 23 and the light emitting direction is toward the other end of the transparent window 23.

After being irradiated into the inside of the transparent window 23 (i.e, the inside surface of the transparent window 23) from a section thereof, the light emitted by the light emitting device 21 is reflected. If the surface layer of the transparent protection layer is air, the light will be reflected totally on the surface layer of the transparent protection layer when an angle of incident light meets with a certain condition. However, if there a object with high refractive index (for example, a finger) pressing on the outside surface of the transparent window 23, the condition on the total reflection on the surface of the transparent window 23 will be destroyed, a part of light beam will transmit through the surface, and be projected onto the surface of the finger. The accidented surface of the finger causes the light beam to be dispersed (diffuse reflection), after transmitting through the transparent window 23, the dispersed light reaches the image collection unit 22, and the image collection unit 22 forms an image recording the position of the finger.

In the above respective implementation, to assure that the image of the pointer with same effect can be obtained on any position of the upper surface of the transparent window, the light emitting device can be implemented by selecting a loop light emitting body provided surrounding the image collection unit, which enable the image of the pointer on the upper surface of the transparent window with same effect can be obtained to meet requirement for analyzing the image later.

In the above respective implementation in FIG. 12 to FIG. 15, the light emitting device 21 is all set fixedly, however, considering that the light emitting device can be used either in a normal photograph mode of the image forming module or in a locating mode of the image forming module. In the first case, the light emitted by the light emitting device should be transmitted through the transparent window as possible as and transferred to the outside surface, and in the second case, the light emitted by the light emitting device should be projected inside the transparent window, therefore, in both of the two cases, to meet with different requirements, the light emitting direction of the light emitting device is needed to be adjusted so that the light emitted by the light emitting device is projected to a predetermined space.

Generally, an existing terminal devices (such as a mobile phone, a PDA) all have a camera as a standard configuration and are provided with a flash lamp at same time. In a specific embodiment of the present invention, the camera and flash lamp already provided in these terminal devices can be reused as the image collection unit and the light emitting device, therefore, the usage of the function module of the existing device can be maximized, at same time, the cost of hardware is not needed to be increased, which increases a scope of applying the embodiment of the present invention.

Figure 16:
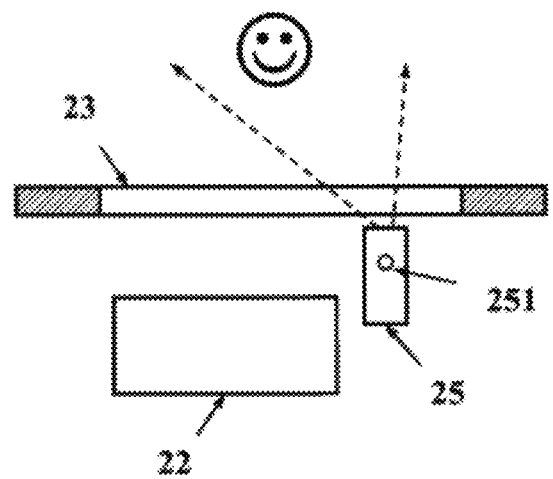
FIG. 16 is a schematic figure illustrating a relative position relation among a light emitting device, an image collection unit and a transparent window in a normal photograph mode when an adjustable light emitting device is provided in an embodiment of the present invention.

As illustrated in FIG. 16, which is a schematic diagram illustrating a case in which the light emitting device includes a light emitting device set in a adjustable way and used in the normal photograph mode, wherein a light emitting device 25 with an angle adjusting module 251 is illustrated, the angel adjusting module is used to adjust the light emitting device 25 to enable the light emitting device 25 to transfer light into the space.

In the normal photograph mode, the angle adjusting module 251 is controlled to adjust the light emitting device 25 to enable the light emitting device 25 to emit light in a first angle, at the time, as possible as much light can pass through the transparent window to be transferred outside.

Figure 17:
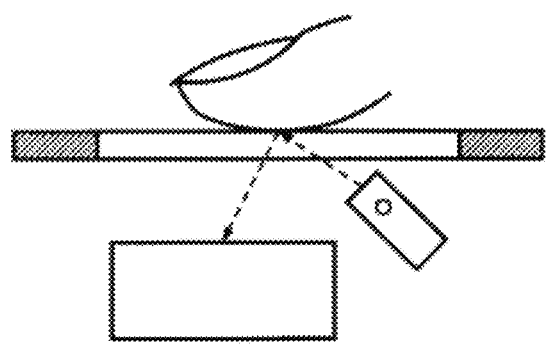
FIG. 17 is schematic figure illustrating a relative position relation among a light emitting device, an image collection unit and a transparent window in a locating mode when an adjustable light emitting device is provided in an embodiment of the present invention.

As illustrated in FIG. 17, which is a schematic diagram illustrating a case in which the light emitting device includes a light emitting device set in a adjustable way and used in the locating mode, wherein a light emitting device 25 with an angle adjusting module 251 is illustrated, in the position mode, the angle adjusting module 251 is controlled to adjust the light emitting device 25 to enable the light emitting device 25 to emit light in a second angle, at this time, as possible as much light can be emitted into the space.

Certainly, considering that the required light intensity is larger to meet the requirement when the light emitting device operates in the normal photograph mode, and it only is required to illuminate a relatively small area in the locating mode, at this time, to save power, the processing unit of the present embodiment is further used to adjust the light intensity of the light emitting device 25 to adjust the light intensity according to different conditions to meet the requirement.

Certainly, in the above terminal device, the light emitting device is adjustable, it will be understood that: it is the light emitting device itself or the light path of the light emitted by it that can be adjusted, when the light path can be adjusted, the light emitting device specifically includes:

A light emitting unit;

A optical device, which adjusts the light path of the light emitting body to enable the light emitting body to transfer the light into the space when the image collection unit operates in the locating mode, and adjusts the light path of the light emitting body to enable the light emitting body to transfer the light to outside space of the transparent window when the image collection unit operates in the photograph mode.

Adjusting the light path can be implemented by adjusting the optical device, for example, when the image collection unit operates in the locating mode, the optical device is in the light path of the light emitting body, the light emitted by the light emitting body passes through the light emitting body and is emitted into the space, when the image collection unit operates in the photograph mode, the optical device is outside the light path of the light emitting body, so that the light emitted by the light emitting body transmits through the transparent window to be emitted outside.

Certainly, it will be understood that: although the configuration of the light emitting device set in an adjustable way is illustrated in FIG. 16 and FIG. 17, it should be understood that, when being set in an adjustable way, the light emitted by it also can be transferred by an optical device, so that the light can be better projected onto a predetermined position, and it also can be provided at other positions, herein the detailed operation thereof will not be provided.

In a specific embodiment of the present invention, a specific position of the image collection unit is not limited, and it can be located at various of positions of the terminal device, such as top surface, back surface, side surface, and even if a corner is possible as long as a finger of a user can reach.

The detailed description on the implementation of the input method of the present embodiment is provided as follows.

After being powered on, the image collection unit is ready.

After a user starts a photograph process, the image collection unit enters into the photograph mode to photograph, which is an inherent function of the image collection unit.

After the user starts a locating process, a light emitting device is enabled when there is a light emitting device, the light emitted by the light emitting device is projected onto a finger contacting with a outside surface of a transparent window, and is reflected into the image collection unit, and an image recording the position of the finger is formed by the image collection unit and is transferred to a processing unit so that a locating process is implemented, that is, a track is computed according to the image and a corresponding input instruction is generated according to the track.

Certainly, when a light emitting device is adjustable, an angle thereof should be also adjusted so that as possible as much light can be emitted onto a predetermined space.

Certainly, those skilled in the art can understand that: the above configuration in which a image of a pointer on a surface of a transparent window is photographed by using an existing image collection unit and then is analyzed to determine the position of the pointer object is applicable to a first operation unit or a second operation unit and both of the first operation unit and the second operation unit of the above terminal device. In addition, beside the first operation unit and the second operation unit of the above terminal device, the above configuration can be separately applicable in any terminal device applying a touching screen, or is used in conjunction with the method and the terminal device of operation control for an operation object which can achieve two types of operation implemented simultaneously. The embodiment of the present invention is not intended to limit these.

Described above is the preferred embodiments of the present invention, it should be pointed out, for those skilled in that art, some improvements and modifications may be made without departing from the principle of the present invention, all of the improvements and modifications should be considered as falling within the scope of the present invention.

What is claimed is:

1. A method of operation control for an operation object, the method comprising:
   obtaining a first operation direction on a first surface of a device and a second operation direction on a second surface of the device of an operation object, wherein the first surface is opposite to the second surface, and the first operation direction is opposite the second operation direction and the operation object includes at least one display object;
   determining an operation corresponding to a direction combination relation of the first operation direction and the second operation direction; and
   implementing the operation on the operation object,
   wherein, each of the display objects has a plurality of levels of display information which is displayed level by level and wherein determining an operation corresponding to a direction combination relation of the first operation direction and the second operation direction includes, when receiving an instruction on the first operation direction and the second operation direction of the display object and the first operation direction and the second operation direction keep away from each other, determining to change the display information of each display object from a first level menu to a second level menu, wherein, the second level menu is an inferior level menu of the first level menu, and in the first level, part of the display information of the display object are displayed, in the second level, all of the display information of the display object are displayed.

2. The method of claim 1, wherein, the step of determining the operation corresponding to the direction combination relation of the first operation direction and the second operation direction comprises:
   determining the operation corresponding to the direction combination relation of the first operation direction and the second operation direction according to the operation type of the operation object.

3. The method of claim 2, wherein, when the operation type of the operation object is an operation on a three dimensional operation object, the step of determining the operation corresponding to the direction combination relation of the first operation direction and the second operation direction according to the operation type of the operation object comprises:
   determining the operation as translating the three dimensional operation object in the first operation direction or the second operation direction when the first operation direction and the second operation direction are same; or
   determining the operation as rotating the three dimensional operation object with respect to a perpendicular line of a trace formed by the first operation direction and the second operation direction as an axis when the first operation direction and the second operation direction are opposite.

4. The method of claim 1, wherein, the method further comprises:
   a third operation of selecting a locating point on the operation object;

implementing the first operation of moving away from the locating point with respect to the locating point, magnifying with respect to the locating point.

5. The method of claim I, wherein, the step of obtaining a first operation direction on a first surface of a device and a second operation direction on a second surface of the device of an operation object comprises obtaining a first operation direction on a first surface of a device and a second operation direction on a second surface of the device of an operation object simultaneously.

6. A terminal device comprising a case and a first operation unit provided on a first surface of the case, the terminal device further comprising:
- a second operation unit provided on the case;
- the first operation unit obtaining a first operation direction on a first surface of the case;
- the second operation unit obtaining a second operation direction on a second surface of the case, wherein the first surface is opposite to the second surface, and the first operation direction is opposite to the second operation direction, and the operation object includes at least one of a display object;
- a processing unit determining an operation corresponding to a direction combination relation of the first operation direction and the second operation direction;
- an operation implementing unit implementing the operation on the operation object, and outputting and displaying a result of implementing the operation, wherein, each of the display objects has a plurality of levels of display information which is displayed level by level;
- wherein, when receiving an instruction on the first operation direction and the second operation direction of the display object and the first operation direction and the second operation direction keep away from each other, the processing unit determines to change the display information of each display object from a first level menu to a second level menu, wherein, the second level menu is an inferior level menu of the first level menu, and in the first level, part of the display information of the display object are displayed, in the second level, all of the display information of the display object are displayed.

7. The terminal device of claim 6, wherein, the processing unit comprises:
- a first processing sub-unit determining an operation type of the operation object according to property of the operation object;
- a second processing sub-unit determining the operation corresponding to the direction combination relation of the first operation direction and the second operation direction according to the operation type of the operation object.

8. The terminal device of claim 7, wherein, when the first processing sub-unit determines that the operation type of the operation object is an operation on a three dimensional operation object, the second processing sub-unit is configured to:
- determine the operation as an operation of translating the three dimensional operation object in the first operation direction or the second operation direction when the first operation direction and the second operation direction are same; or
- implement rotating operation with respect to a perpendicular line of a track formed by the first operation direction and the second operation direction as an axis when the first operation direction and the second operation direction are opposite.

9. The terminal device of claim 8, wherein, the first operation unit is set at a first position of the case, the second operation unit is set at a second position opposite to the first position of the case.

10. The terminal device of claim 6, wherein, the first unit comprises:
- an image collection unit; and
- a transparent window provided in an image collection channel of the image collection unit, wherein the first surface of the transparent window being away from the image collection unit and spacing the image collection unit by a certain distance to form a space.

11. The terminal device of claim 10, wherein, the first operation unit further comprises:
- at least one of light emitting device which emits light into the space,
- wherein the light emitting device and the image collection unit is located on same side of the first surface.

12. The terminal device of claim 11, wherein, the image collection unit has a photograph mode and a locating mode, when the image collection unit operates in the locating mode, the light emitting device is in an enabled state.

13. The terminal device of claim 11, wherein, the light emitting device is set fixedly, its light emitting direction is toward the transparent window.

14. The portable electrical device of claim 11, wherein, the light emitting device is set fixedly, the first operation unit further includes an optical device which is set in the light emitting direction of the light emitting device and directs light emitted by the light emitting device into the space.

15. The terminal device of claim 11, wherein, the light emitting device is set fixedly, the light emitting device is a loop light emitting body set surrounding the image collection unit.

16. The terminal device of claim 11, wherein, the light emitting device is set fixedly in the transparent window, located at one end of the transparent window and the light emitting direction is toward the other end of the transparent window.

17. The terminal device of claim 11, wherein, the light emitting device is adjustable, and the light emitting device comprises:
- a light emitting unit;
- an angle adjusting module, connected to the light emitting unit, for adjusting the light emitting body to enable the light emitting body to emit light into the space when the image collection unit operates in the locating mode.

18. The terminal device of claim 17, wherein, the processing unit is further configured to adjust light intensity of the light emitting device.

19. The terminal device of claim 11, wherein, the light emitting device is adjustable, the light emitting device comprises:
- a light emitting unit;
- an optical device, for adjusting light path of the light emitting body to enable the light emitting body to emit light into the space when the image collection unit operates in the locating mode, and for adjusting light path of the light emitting body to enable the light emitting body to emit light outside the space.

20. The terminal device of claim 19, wherein, when the image collection unit operates in the locating mode, the optical device is located in the light path of the light emitting body, the light emitted by the light emitting body passes the light emitting body and is emitted into the space, when the image collection unit operates in the photograph mode, the optic device is located outside the light path of the light emitting body, the light emitting by the light emitting body transmits the transparent window and is emitted outside.

21. The terminal device of claim 6, wherein, the second operation unit comprises:
   an image collection unit; and
   a transparent window set in an image collection channel of the image collection unit, a surface of the transparent window being away from the image collection unit and spacing the image collection unit by a certain distance to form a space,
   wherein,
   the image collection unit is configured to pick up an image when a pointer contacts with the first surface of the transparent window;
   the processing unit is configured to compute a track of the pointer according to the image and obtain the second operation direction of the operation object.

22. The terminal device of claim 6, wherein, the first operation direction and the second operation direction are obtained simultaneously.

\* \* \* \* \*